US005248235A

United States Patent [19]

Poten et al.

[11] Patent Number: 5,248,235

[45] Date of Patent: Sep. 28, 1993

[54] DOLLY SERVING AS TRAVELING AID FOR A DEFECTIVE WHEEL ON A MOTOR VEHICLE

[75] Inventors: Peter-Randolf Poten, Marmagen; Karl Steffens, Dahlem; Gunther Gebhardt, Stadtkyll, all of Fed. Rep. of Germany

[73] Assignee: DIEHL GmbH & Co., Nuremberg, Fed. Rep. of Germany

[21] Appl. No.: 885,475

[22] Filed: May 19, 1992

[30] Foreign Application Priority Data

May 21, 1991 [DE] Fed. Rep. of Germany ....... 4116480

[51] Int. Cl.[5] .............................................. B60B 30/10

[52] U.S. Cl. .................................. 414/430; 280/79.4; 280/43.11

[58] Field of Search .............................. 414/430, 537; 280/43.11, 62, 79.4

[56] References Cited

U.S. PATENT DOCUMENTS 1,171,808 2/1916 Siberell .......................... 280/79.4 X
1,419,067 6/1922 McCarthy .......................... 414/430
2,247,177 7/1941 Sutter .................................. 414/430
2,350,118 5/1944 Knapp ................................ 414/430
2,358,864 9/1944 Lockwood .......................... 414/430
2,414,383 1/1947 Merriam ............................. 414/430
2,552,804 5/1951 Morris ................................ 414/430
2,607,607 8/1952 Day .................................. 414/430 X
3,145,860 8/1964 Graves ............................... 414/430
3,921,740 11/1975 Forster ........................... 180/907 X
4,726,727 2/1988 Tyler .................................. 414/430
4,913,459 4/1990 Smeitink ......................... 414/430 X
5,039,123 8/1991 Smeitink ......................... 414/430 X

FOREIGN PATENT DOCUMENTS 0334852 11/1903 France .............................. 280/79.4
2516022 5/1983 France ................................ 414/430
WO91/06437 5/1991 World Int. Prop. O. .

*Primary Examiner*—Michael S. Huppert
*Assistant Examiner*—James W. Keenan
*Attorney, Agent, or Firm*—Scully, Scott, Murphy & Presser

[57] ABSTRACT

A dolly or roll carriage serving as a traveling aid for a defective wheel on a motor vehicle. The dolly includes an undercarriage equipped with rollers, a ramp plate for the driving ascent thereon of the defective wheel, a well for the receipt and for the lateral or sideways fixing of the wheel and a front stop member for the wheel whereby the stop member is generally configured in the shape of a wheel rim.

4 Claims, 2 Drawing Sheets

DOLLY SERVING AS TRAVELING AID FOR A DEFECTIVE WHEEL ON A MOTOR VEHICLE

BACKGROUND OF THE INVENTION

1. Field of the Invention

The present invention relates to a dolly or roll carriage serving as a traveling aid for a defective wheel on a motor vehicle, and wherein the dolly includes an undercarriage equipped with rollers, a ramp plate for the driving ascent thereon of the defective wheel, a well for the receipt and for the lateral or sideways fixing of the wheel and a front stop member for the wheel whereby the stop member is generally configured in the shape of a wheel rim.

2. Discussion of the Prior Art

A dolly or roll carriage of that type is essentially known from the disclosure of French Patent 25 16 022. Arranged on an undercarriage possessing three wheels is a ramp plate for the ascent thereon of the defective wheel of a motor vehicle, as well as a well for the receipt and for the lateral fixing of the wheel and a front stop member for the wheel. The ramp plate in its lowered or downwardly swung position has its side plates resting on the ground so that during the driving of the defective wheel onto the ramp plate, the dolly is braked in place. Nevertheless, it can occur that at the beginning of the driving onto the ramp plate, as a consequence of a step being present between the ramp plate and the ground, the dolly can possibly be displaced. As a result thereof, either the driving of the wheel onto the ramp plate is then no longer possible, or the dolly has displaced itself to such an extent relative to its position with respect to the wheel that the well is no longer in alignment with the vehicle wheel which is to be received and positioned therein.

SUMMARY OF THE INVENTION

Accordingly, it is an object of the present invention to propose a dolly or roll carriage of the type described which is reliably braked during the driving thereunto by the vehicle wheel. Moreover, the dolly should enable the vehicle to travel forwardly as well as rearwardly.

The invention solves the foregoing object in that the undercarriage of the dolly and the stop member are formed by the well, wherein four rollers are supported on the well so as to face or extend towards the roadway, with the ramp plate being movably supported on the well through the intermediary of trunnions, and wherein the well is equipped on the outside thereof with at least one braking arrangement for the roller or rollers facing the roadway which is controlled by the vehicle and the ramp plate.

Inventively, during the travel or driving on of the defective wheel onto the dolly, the dolly can be reliably manipulated, and without encountering any problems can be attached to a motor vehicle on either the front axle or on the rear axle. Moreover, the dolly also is adapted for front wheel-drive motor vehicles. During the rearward travel of the vehicle there is afforded that the defective wheel will no longer jump out of the dolly. Even in the presence of larger obstructions, such as sidewalk edges, streetcar tracks or rail crossings, the dolly will remain fixedly connected with the defective wheel of the vehicle. Even when encountering loose sand or gravel will the dolly remain capable of functioning, wherein this dolly will operate in a manner such as a sled; for instance, the rollers which face towards the roadway act as sled runners.

BRIEF DESCRIPTION OF THE DRAWINGS

Advantageous modifications of the invention can now be more readily ascertained from the description of an illustrative exemplary embodiment of the invention, as taken in conjunction with the accompanying drawings; in which.

DETAILED DESCRIPTION

Figure 1:
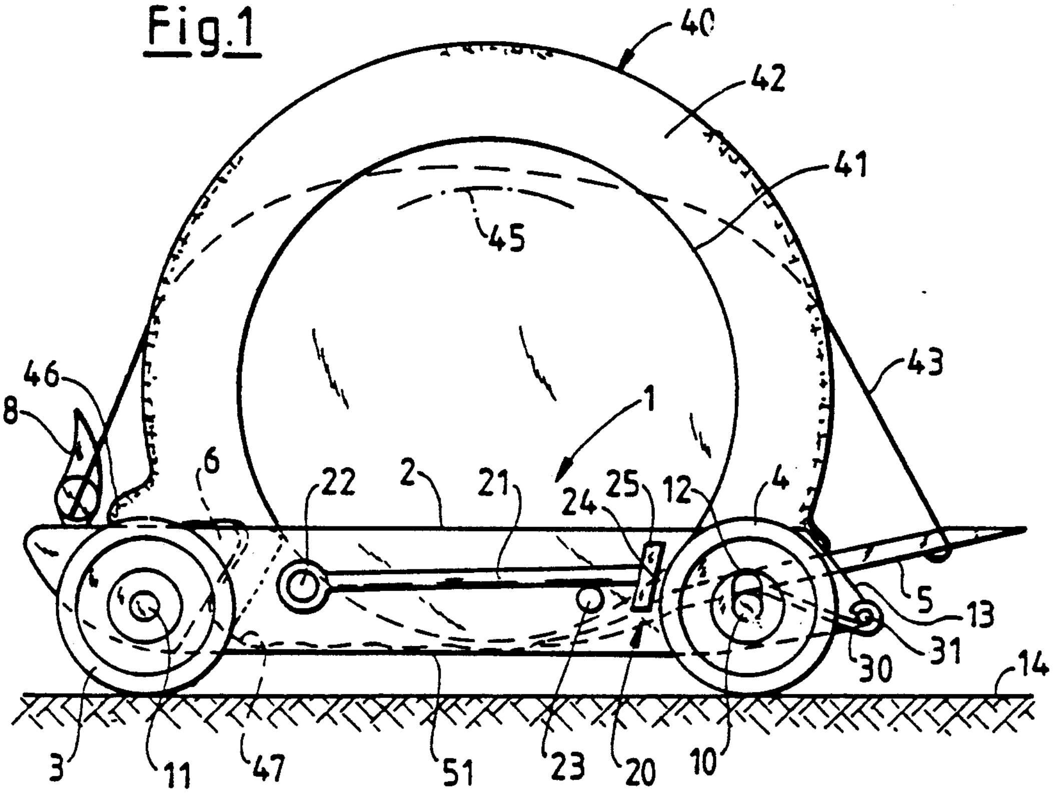
FIG. 1 illustrates a dolly or roll carriage having a defective vehicle wheel supported thereon, as shown in a side elevational view.
Figure 2:
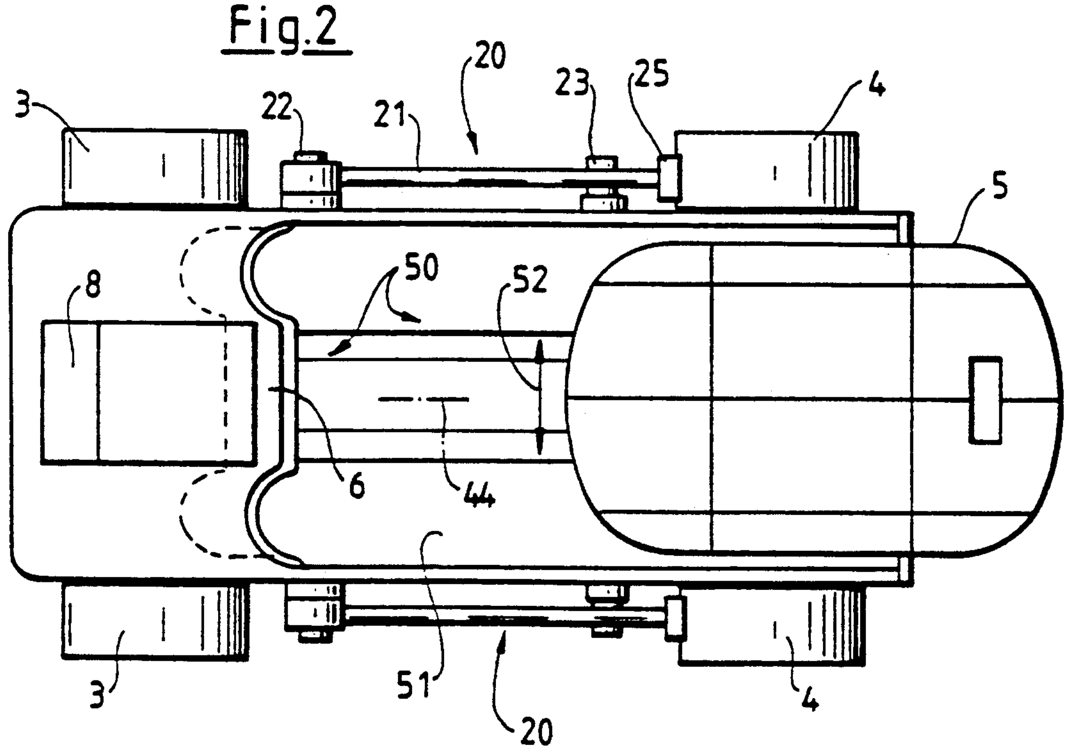
FIG. 2 illustrates a top plan view of the dolly with the wheel omitted.

A roll carriage or dolly 1 is constructed of a well 2 consisting of sheet metal, and includes four rollers 3, 4 facing the roadway, a ramp plate 5 constructed as a lifting or hoist-member, a front contact or stop member 6, and of a clamping band 7 with a clamping device 8.

The rollers 4 which are located at the end towards the vehicle wheel which is to be driven onto the ramp plate are fastened to a shaft 10, and the oppositely located rollers 3 to a shaft 11. Both shafts 10, 11 are supported in the well 2, whereby the shaft 10 towards the oncoming vehicle wheel is located in a vertical elongated aperture or slotted hole 12.

Provided for the rollers 4 facing the roadway are mutually conforming, identically constructed braking devices 20. A brake lever 21 is pivotally supported on a trunnion 22 which is located on the side of the well, and with the braking device 20 in its inoperative condition, contacts against a striker 23 on the side of the well. Formed thereby is a spacing or gap 24 between a brake shoe 25 which is mounted on the brake lever 21 and the roller 4 facing towards the wheel being driven into the ramp plate.

The ramp plate is tiltably supported on the shaft 10. The ramp plate 5 is fixedly connected with two levers 30 at its lower or underside. The levers 30 are pivotally connected with trunnions 34 located on the end of the well facing towards the roadway.

A defective wheel 40 with a wheel rim 41 and a tire cover 42 stands fixedly clamped in the dolly or roll carriage 1 by means of a clamping band 43. Thereby, the clamping band 43 is connected with the end of the ramp plate 5 facing towards the wheel being received, and is clampingly retained in the clamping device 8. The clamping band 43 is conducted over the tire cover 42 in conformance with a centerline 44, whereby this wheel cover 42 is clamped close to a bottom 45 of the rim 41.

As a result, the wheel 40 is constructed in a somewhat W-shape at its upper side. A corresponding W-shaped contour 50 is also evident in the contact or stop member 6 and a bottom 51 of the well 2. In view of the foregoing, there is produced a close-fitting and positive connection between the wheel 40 and the dolly 1. The inclination towards tipping sideways in the direction of the arrow 52 by the wheel 40 relative to the dolly 1 is thereby negligibly small.

The close-fitting and closely-coupled connection between the wheel 40 and the dolly 1 is also additionally enhanced in that the stop member 6 projects wedge-shaped into the tire cover 42 and thereby the beads 46, 47 of the tire cover 42 lead to an increased surface contacting at the stop member 6.

Figure 3:
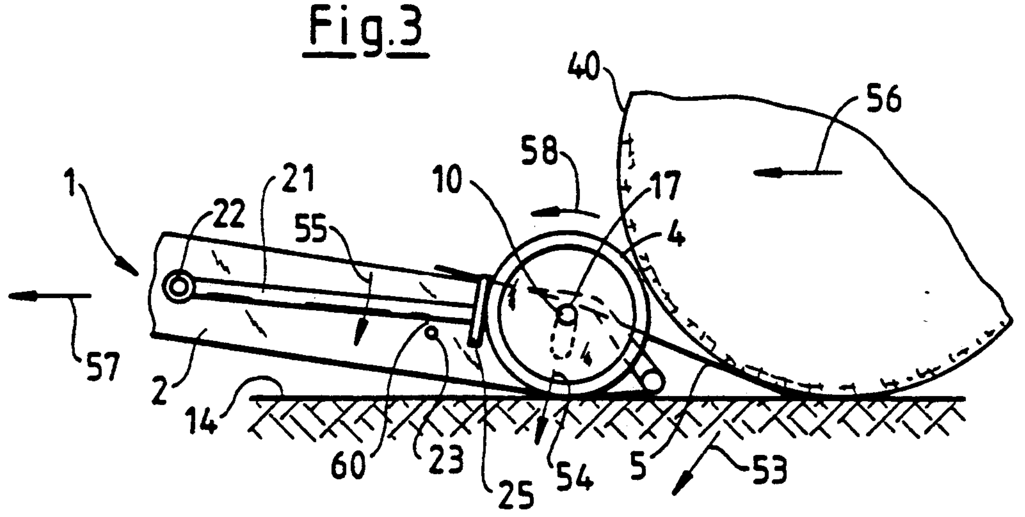
FIGS. 3 through 5 generally diagrammatically illustrates operative phases during the driving of the defective wheel onto the dolly as constructed pursuant to FIGS. 1 and 2.

In accordance with FIG. 3, the ramp plate 5 is tilted in the direction of the arrow 53, as a result of which the well 2 contacts below the shaft 10 against the roadway 14. The braking device 20 has become operative in that the lever 21, because of its weight, has implemented a pivoting movement in the direction of the arrow 55 up to the contacting of the brake shoe 25 against the rollers 4. Hereby, there is formed a spacing or gap 60 between the lever 21 and the striker 23. The ramp plate 5 lies against the shaft 10 at point 14. Due to the driving of the wheel 40 into the dolly or carriage 1 in the direction of arrow 56, the wheel 40 attempts to push the dolly 1 away in the direction of the arrow 57. Inasmuch as the braking device 20 is already effective due to the lowering of the well 2 about the shaft 11 at the side towards the clamping band, and wherein the shaft acts as a rotary axis in the direction of arrow 54, any eventual minimal rotation of the wheels 4 in the direction of the arrow 58 results in an increase in the braking effect, in that the lever 21 presses the brake shoe 25 still more intensely against the roller 40.

Figure 4:
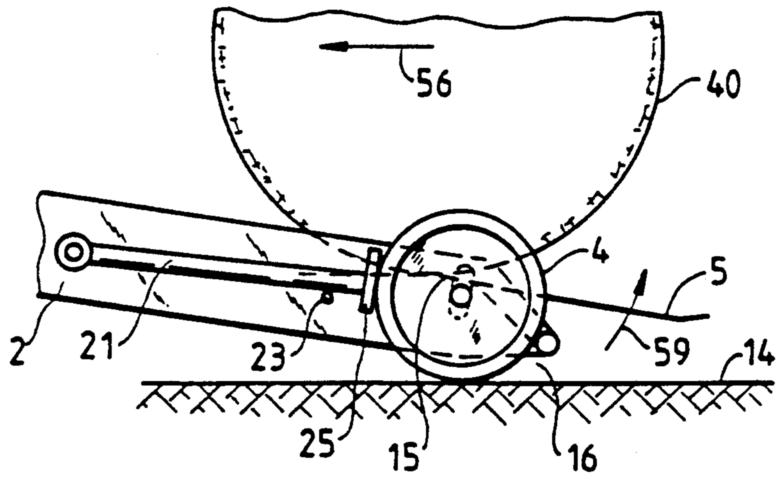

In accordance with FIG. 4, the wheel 40 is located in a position 15 relative to the ramp plate 5, whereby the ramp plate 5 is located almost in parallel with the roadway 14.

Due to the pivoting movement of the ramp plate 5 in the direction of the arrow 59, the well 2 has raised itself up from the roadway 14 in accordance with a distance or gap 16. The brake shoe 25 is still in contact with the roller 4, whereby the striker 23 just comes into contact with the lever 21.

Figure 5:
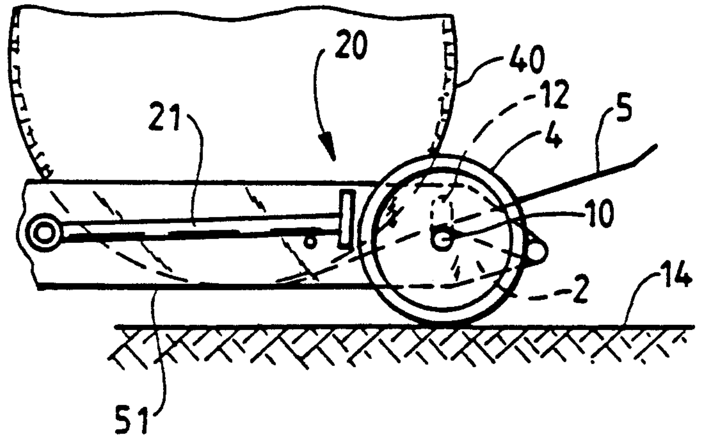

Through the further rolling of the wheel 40 onro the ramp plate 5 in the direction of the arrow 56, as shown in FIG. 5, the ramp plate 5 is pressed against the bottom 51 of the well 2. As a result thereof, the ramp plate 5 has reached the illustrated position, whereby the well assumes its normal position with regard to the roadway 14, in that the shaft 10 lies against the lower end of the slotted hole or aperture 12, and the brake of the braking device 21 is fully released in accordance with the illustrated position.

The pivotable support of the ramp plate 5 at the end 13 of the well 2 , instead of the support thereof through the trunnions 31 and the therewith hingedly connected lever 30, can be implemented in an inexpensive manner through the use of a sheet metal hinge. For this purpose, a channel is formed at the end 13 of the well 2 into which there engages a corresponding channel of a further sheet metal plate. This further sheet metal plate and the sheet metal hinge joint each possess a width which generally corresponds with the width of the ramp plate 5. The further sheet metal plate is welded together with the ramp plate 5 and corresponds with the position of the lever 30 as illustrated in FIG. 1.

What is claimed is:

1. In a dolly forming a traveling aid for a defective wheel of a motor vehicle, said dolly including a traveling frame equipped with four rollers, a ramp plate constituting a lifting member for the driving there onto of the defective wheel; a well for receiving and laterally positioning therein of he wheel, a front stop member for the wheel, said traveling frame being formed by said well, a shaft having two of said rollers mounted thereon transversely extending through said well and located towards an end of the well receiving said defective wheel, said ramp plate being pivotally supported on said shaft and trunnions for movably supporting said ramp plate on said well; the improvement comprising:

a) at least one braking means for the rollers which are toward the end of the will receiving the defective wheel, said at least one braking means being arranged on the exterior of aid well, said at least one braking means being actuatable by said deflective wheel and ramp plate, said at least one braking means including a braking lever with a brake shoe and being supported by a trunnion fastened to said well, said braking lever contacting against a striker located on said well only in an inoperative position of said braking means;

b) said well having generally vertically extending slotted holes formed therein, said shaft being supported in said slotted holes;

c) and said ramp plate including two levers at the underside thereof forming a connection with the trunnions at the end of the well receiving the deflective wheel.

2. A dolly as claimed in claim 1, wherein a first end of a clamping band for said wheel is fastened to a free end of said ramp plate, and a second end of said clamping band is guided in a clamping device which is fastened to said well.

3. A dolly as claimed in claim 1, wherein said stop member is formed by said well and possesses a W-shaped contour in conformance with a rim of the wheel.

4. A dolly as claimed in claim 3, wherein said well has a similar W-shaped contour.

* * * * *

UNITED STATES PATENT AND TRADEMARK OFFICE

CERTIFICATE OF CORRECTION

PATENT NO. : 5,248,235
DATED : September 28, 1993
INVENTOR(S) : Peter-Randolf Poten, et al.

It is certified that error appears in the above-indentified patent and that said Letters Patent is hereby corrected as shown below:

Column 3, line 38: "onro" should read --onto--

Column 4, line 16, Claim 1: "he" should read --the--

Column 4, line 25, Claim 1: "will" should read --well--

Column 4, line 27, Claim 1: "aid" should read --said--

Column 4, line 28, Claim 1: "deflective" should read --defective--

Column 4, lines 40-41, Claim 1: "deflective" should read --defective--

Signed and Sealed this

Twenty-sixth Day of July, 1994

Attest:

BRUCE LEHMAN

*Attesting Officer* *Commissioner of Patents and Trademarks*